Feb. 17, 1959  J. GARST  2,874,029
PROCESS OF PREPARING AQUA AMMONIA
Filed May 14, 1956
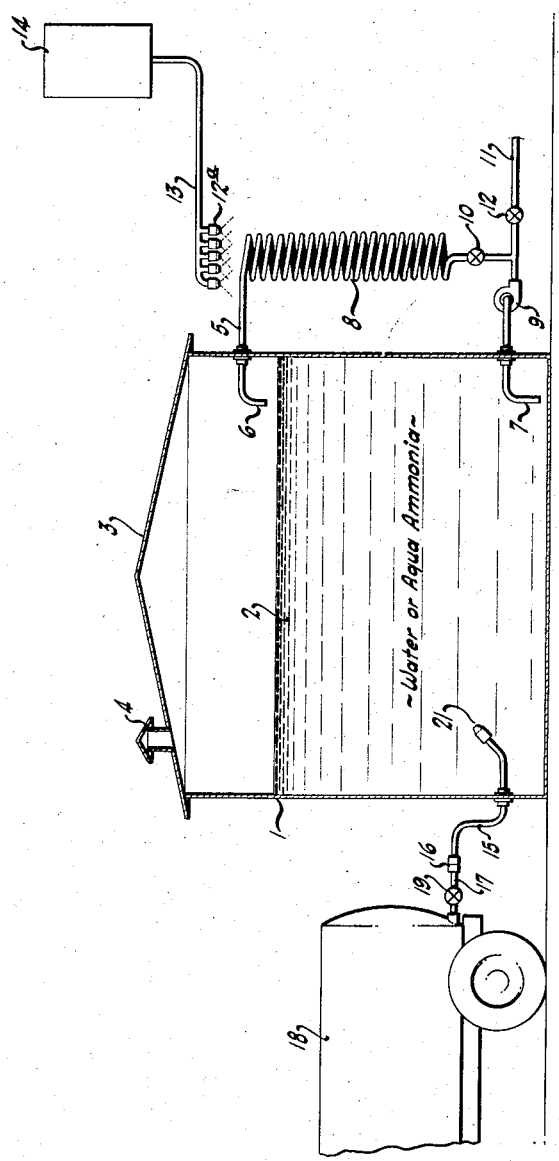
INVENTOR.
JONATHAN GARST
BY
ATTORNEYS United States Patent Office 2,874,029
Patented Feb. 17, 1959

2,874,029
PROCESS OF PREPARING AQUA AMMONIA
Jonathan Garst, Oakland, Calif.
Application May 14, 1956, Serial No. 584,648
1 Claim. (Cl. 23—193)

This invention relates to and in general has for its object the provision of a simple method of producing aqua ammonia from anhydrous ammonia.

More specifically, the object of this invention is a process of producing aqua ammonia of commercially acceptable concentration from anhydrous ammonia wherein anhydrous ammonia is introduced several times in relatively small amounts into a confined body of water or weak aqua ammonia with cooling between introductions so that the heat of formation and solution of the added quantity of anhydrous ammonia will not raise the temperature of the resulting solution above a point at which the vapor pressure is one atmosphere.

The United States has plant capacity to manufacture nearly 4,000,000 tons of ammonia a year for fertilizer. Ammonia is a gas at normal temperatures and must be stored in vessels which will stand a test pressure of 265 p. s. i. Most of this ammonia is made into solid fertilizer by reacting it with an acid to produce such products as ammonium sulphate and ammonium nitrate. This is an expensive process and because the value of these fertilizers is rated primarily on the quantity of nitrogen they contain, little additional value except convenience in handling is added to the product while the concentration of nitrogen is reduced from 82 percent in anhydrous ammonia (the starting material) to 21 percent N and 33 percent N, respectively, in fertilizer grade ammonium sulphate and ammonium nitrate.

In order to avoid the expense of manufacturing solid salts, methods have been devised for introducing the anhydrous ammonia gas directly into the soil. This requires high pressure storage and equipment with safety devices and skilled labor. More recently, aqua ammonia containing 20–25 percent N has been sold for field application. The 20 percent N aqua ammonia, which is standard in California, has a low vapor pressure which allows a satisfactory margin of safety in handling the material in non-pressure tanks even in hot climates.

With a 150-mile haul in California, it costs less than one-third as much to transport nitrogen in 82 percent N anhydrous ammonia as in 20 percent N aqua ammonia (0.52 cent per pound N vs. 1.75 cents per pound N), but it costs twice as much for storage of nitrogen as anhydrous ammonia as it does for aqua ammonia. Moreover, aqua ammonia tankage can be used alternatively for grain storage.

Transportation is a considerable part of the farm price of nitrogen fertilizer because the manufacturing plants are very large and cannot be scattered in small units near areas of consumption. Storage likewise is a very large problem for fertilizer ammonia. The periods of field application are limited, but economy in manufacture requires constant full capacity output. Ammonia plants cost about $300 per annual ton capacity. When running at full capacity the plant charges for taxes, depreciation, insurance, etc., are generally calculated at $45.00 per ton. At half capacity, this plant cost alone rises to $90.00 a ton. The price of ammonia is listed in trade journals at $85.00 a ton.

The economical pattern of commerce in this large volume business would be to transport the unaltered factory product, anhydrous ammonia, directly to the farm or near to the farm, thus saving any additional processing costs and reducing freight to a minimum; then to convert this anhydrous ammonia out of the high pressure shipping tanks to non-pressure aqua ammonia, thus saving on storage and handling costs.

This pattern has not developed because the available process for converting anhydrous to aqua ammonia has been too expensive, not only for a farmer, but even for many local distributors.

The formation of aqua ammonia from anhydrous ammonia in water occurs readily but it involves one big problem, the dissipation of the heat of formation and solution. If 24.3 pounds of ammonia are introduced without loss of heat into 75.7 pounds of water to make 100 pounds of 20 percent N aqua ammonia, the temperature of the solution will be raised 78 degrees F. above the starting temperatures. Since 20 percent N aqua ammonia has a vapor pressure of one atmosphere at about 110 degrees F., and because the starting temperatures generally range from 50 degrees F. to 70 degrees F., if anhydrous ammonia is to be quickly converted to 20 percent N aqua ammonia, rapid cooling must be attained. The standard machine for such conversion costs $5,000 uninstalled and has a capacity of about 3 tons anhydrous ammonia per hour. Besides, it requires a skilled attendant for operation. The slow conversion with this machine greatly hampers movement of anhydrous ammonia by pressure tank trucks which is the only practical way to reach farms and many rural communities. In California, trucks haul loads of 16–20 tons $NH_3$. This standard machine requires 5–7 hours unloading time for such loads, and truck demurrage at a high hourly rate is generally charged after two hours unloading time.

The principal object of my invention is the provision of a conversion method whereby the farmer can purchase his fertilizer in the form of anhydrous ammonia (factory product), take advantage of the lower transportation charges on nitrogen with that product, and convert the anhydrous ammonia to aqua ammonia without the necessity of installing an expensive conversion unit, without having to incur demurrage charges, and without the necessity of employing the skilled labor required for operating the standard converters presently available.

The drawing accompanying this application and constituting a part thereof is a schematic diagram of the equipment used in carrying out the method of my invention, each element of such equipment per se being old and readily available.

As illustrated in this diagram, the principal piece of equipment required for carrying out my process is a tank 1 of conventional construction arranged to initially contain a body of water 2, and provided with a cover or hood 3 having one or more vent holes 4. Mounted on one side of the tank 1 is an aqua ammonia circulating line 5 communicating at its upper and lower ends 6 and 7 with the interior of the tank and provided with exterior cooling coil 8. Disposed in the line 5 is a pump 9, the line 5 being provided with a valve 10 located upstream of the discharge side of the pump. Connected to the line 5 between the pump 9 and the valve 10 is a tank discharge line 11 provided with a valve 12. Disposed above the cooling coil 8 is a water spray head 12a communicating through a line 13 with a suitable source of water 14.

As a result of this construction, it will be seen that with the valve 12 closed and the valve 10 open, the pump 9 can be used to circulate ammonium hydroxide solution through the cooling coils 8 during the conversion process and/or thereafter in order to dissipate the heat of formation and solution. If the valve 10 be closed and the valve 12 opened, the same pump 9 can be used to pump the contents of the tank into the farmer's tank truck. Obviously, a two-way valve can be substituted for the valves 10 and 12.

Extending into the tank 1 is a high pressure anhydrous ammonia charging line 15 provided at its outer end with a quickly detachable connector 16 arranged to be connected with a line 17 from a tank truck and/or trailer 18 through a valve 19 carried on the truck or trailer or on the line 15. Optionally, the inner end of the line 15 can be provided with discharge nozzles 21.

Assuming that in carrying out my process $n$ number of tank cars or truck loads (unit loads) of anhydrous ammonia are to be converted to aqua ammonia in the tank 1, a sufficient quantity of water is delivered to the tank so that after the $n^{th}$ load has been delivered to the tank the resulting solution (aqua ammonia) will have the desired nitrogen content (conventionally 20 percent nitrogen). This having been done, the first unit load of anhydrous ammonia is introduced into the water through the line 15, the valve 19 of course having been opened for this purpose. Actual test runs of the process have shown that the anhydrous ammonia is immediately absorbed even when the ammonia is introduced at a rapid rate with a relatively small number of nozzles. Test runs have further established the fact that sufficient agitation of the solution results from the mere introduction of the anhydrous ammonia under its own pressure to bring the solution to a uniform concentration and temperature throughout its entire body without the necessity of using any additional agitating equipment. Proper agitation is essential for the required distribution of the heat of formation and solution throughout the entire body of the water or aqua ammonia.

Although the addition of any amount of anhydrous ammonia to water or an aqua ammonia solution results in heat of formation and solution, the conditions under which my method are carried out preclude such heat from increasing the temperature of the solution to a point where the vapor pressure of the solution exceeds one atmosphere. Furthermore, since no simultaneous cooling is involved no moving machinery is needed during the unloading of the truck, so skilled attention is not required.

As illustrated in the drawings, the temperature of the solution can be lowered to the desired point by circulating it through the coils 8 and passing water from any suitable source through the spray head 12a and then discharging such water to waste or using it for irrigation purposes. This can be done during the time that the anhydrous ammonia is being charged into the tank 1, and/or thereafter, for since normally there is an interval of at least one day between each unit load delivery of anhydrous ammonia, time is not a factor.

The above method of alternately charging and cooling the tank 1 is followed until the last or $n^{th}$ unit load of anhydrous ammonia has been delivered to the tank. The final solution should have the required nitrogen content and can be pumped by the pump 9 from the tank 1 to the farmer's tank truck for trucking to whereever it may be needed.

By way of example in one test run 37,000 gallons of water at 55 degrees F. were placed in a 70,000 gallon tank and 16 tons of anhydrous ammonia from a truck tank and trailer injected directly therein near the bottom of the tank through twenty nozzles having 5/16-inch orifices, the nozzles being directed tangentially with respect to the desired path of circulation of the solution within the tank. Excellent absorption of the anhydrous ammonia at the rate of 10 tons per hour was thus obtained accompanied by a uniform rise in temperature throughout the body of the solution of about 28 degrees F. Here it should be noted that the anhydrous ammonia was injected into the water only under its own pressure, that is, the pressure of the truck tank.

On the following day and after only a slight degree of cooling a second truck load of 16 tons of anhydrous ammonia was similarly injected into the solution, the final temperature of the resulting solution being about 104 degrees F.

The addition of the third and final charge of 16 tons of anhydrous ammonia was delayed for three days during which time the solution was cooled to 66 degrees F. The third and final charge of anhydrous ammonia resulted in an increase in the temperature of the solution of 24 degrees F., the final temperature of the solution being in the order of 90 degrees F., a temperature at which the vapor pressure of the solution was well within one atmosphere.

It will be noted that with several equal injections of ammonia the last injection, which is the most critical, gives the smallest temperature rise because the heat of formation and solution of this unit must heat the preceding units of ammonia injected, as well as the original water. This increases the practical value of my process.

In very hot climates, it may be necessary to add the total charge of anhydrous ammonia to the water in a greater number of units, or to lower the final concentration, the reverse being true in cooler climates. The essential factor here is always to maintain the vapor pressure of the solution below one atmosphere.

This method of conversion then involves the use of only a conventional non-pressure tank which at all events a farmer should have available anyway if he is fertilizing with aqua ammonia, and which otherwise can be used for grain storage. A pump is required, but the farmer is already equipped with one if he is using farm stored aqua ammonia, for he has to pump the aqua ammonia from his storage tank to his own truck tank. The only additional equipment then required is some high pressure hose, valves, tubing, and nozzles.

My method then enables the farmer to purchase his nitrogen in the form of anhydrous ammonia, thus enabling him to materially reduce his transportation charges; to convert the anhydrous ammonia to aqua ammonia in an inexpensive non-pressure tank which he either already has or at all events should have if he is going to fertilize with aqua ammonia; to obviate the use of skilled labor; and to avoid demurrage charges.

I claim:

A process of converting anhydrous ammonia to aqua ammonia of a predetermined nitrogen content by the total addition of a predetermined quantity of anhydrous ammonia to a sufficient quantity of a confined body of water to produce said aqua ammonia of predetermined nitrogen content comprising: adding said anhydrous ammonia to said water in $n$ substantially equal increments and cooling the resulting solution prior to the addition of each successive increment of anhydrous ammonia to a sufficient extent to lower the vapor pressure thereof substantially below one atmosphere, said vapor pressure at no time exceeding one atmosphere, the number of increments $n$ of anhydrous ammonia so added being such that the heat of formation and solution resulting from the addition of the $n^{th}$ or final increment to the preceding solution will not result in an increase in the vapor pressure of the final solution above one atmosphere.

References Cited in the file of this patent

UNITED STATES PATENTS

| 1,216,059 | Bosch | Feb. 13, 1917 |
|---|---|---|
| 1,885,012 | Harvey | Oct. 25, 1932 |
| 2,701,182 | Sellers et al. | Feb. 1, 1955 |